INVENTORS
Kenneth Jones, Eric H. Joscelyne
BY and Peter J.J. Harvey
McDougall, Hersh and Scott
ATTORNEYS INVENTORS
*Kenneth Jones, Eric H. Joscelyne*
BY *and Peter J. J. Harvey*
*McDougall, Hersh and Scott*
ATTORNEYS INVENTORS
Kenneth Jones, Eric H. Joscelyne
and Peter J.J. Harvey
BY
McDougall, Hersh and Scott
ATTORNEYS

United States Patent Office 3,682,781
Patented Aug. 8, 1972

3,682,781

SOLVENT TRANSFERENCE OF A SOLUTE BY DISTILLATION IN THE PRESENCE OF A SECOND SOLVENT

Kenneth Jones, 1 Regent Close, and Eric H. Joscelyne, 19 Parkway, both of Wilmslow, Cheshire, England, and Peter J. J. Harvey, 107 Chester Road, Hazel Grove, Stockport, Cheshire, England Filed Apr. 17, 1970, Ser. No. 29,392
Int. Cl. B01d *3/40;* C01b *15/02*
U.S. Cl. 203—60 10 Claims

ABSTRACT OF THE DISCLOSURE

A process for transferring hydrogen peroxide dissolved in at least one first solvent (e.g. a mixture of isopropyl alcohol and a small amount of acetone) to at least one second less volatile solvent (e.g. an ester solvent such as n-propyl or n-pentyl acetate) is described, whereby the solution in said first solvent is introduced at the top of a fractionation zone, said second solvent is introduced at the bottom of said zone and—when equilibrium conditions are reached—the hydrogen peroxide dissolved in said second solvent leaves said zone at its bottom while said first solvent leaves at the top of said zone; the process is especially applicable to the production of a hydrogen peroxide solution capable of being used in chemical processes after the hydrogen peroxide has been manufactured by the oxidation of isopropyl alcohol.

Figure 1A:
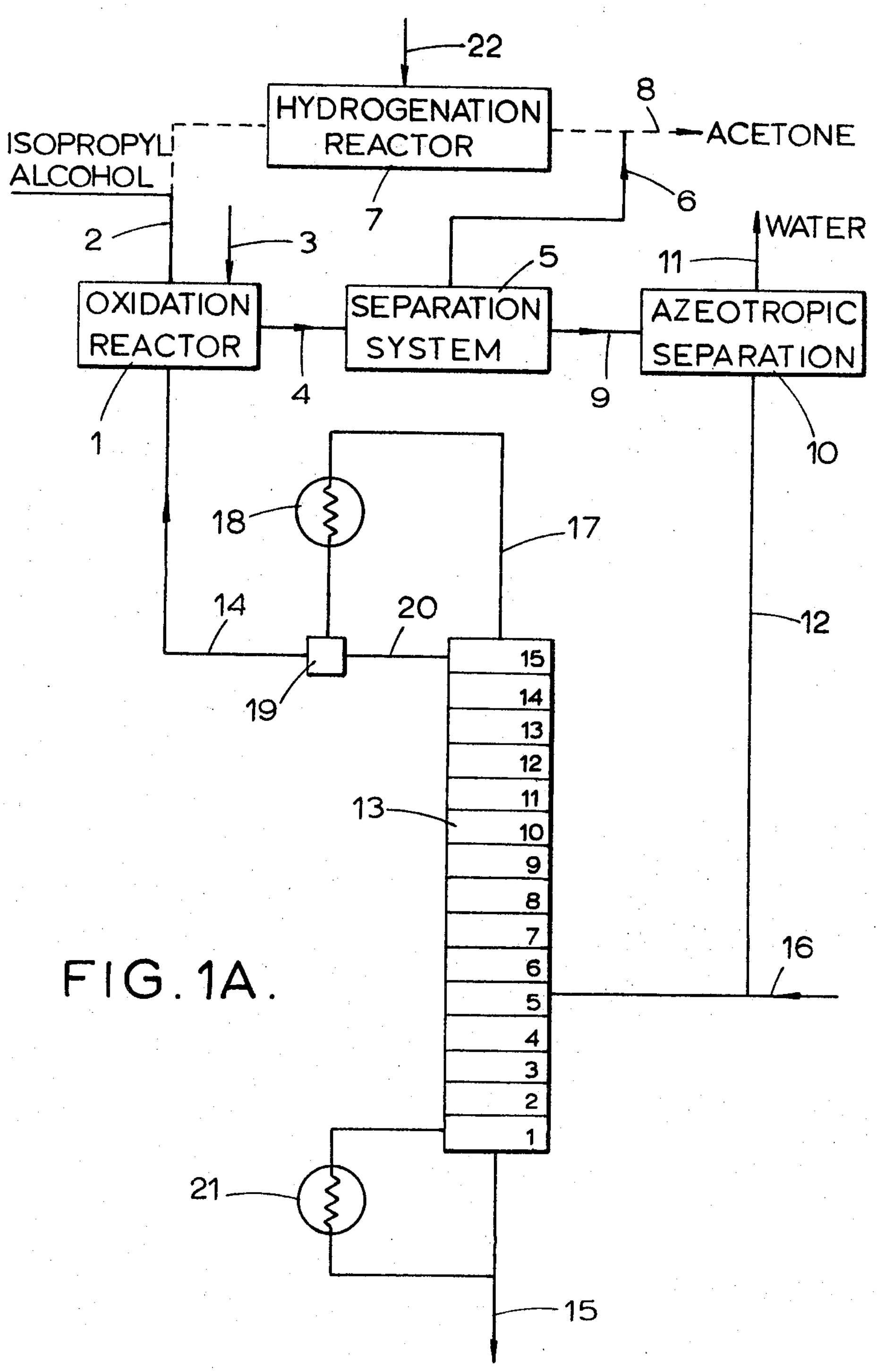

The present invention relates to a process for transferring a thermally unstable solute such as a peroxidic compound (particularly hydrogen peroxide) from a first volatilizable solvent or solvent mixture to a second, less volatile, volatilizable solvent or solvent mixture.

The transfer of a relatively non-volatile component from one or more first solvents to a second solvent or solvents may be easily effected by the well known solvent-solvent extraction procedures if the first and second solvents are immiscible or have very limited mutual solubility and the relatively non-volatile solute has some solubility in each solvent. This method is not suitable if the solvents have a large degree of mutual solubility or are miscible in all proportions, and the only presently known alternative is to totally distil or otherwise evaporate the first solvent from the solute and then redissolve in, or dilute with, the second solvent. This operation is, however, a most dangerous operation if a solution of hydrogen peroxide in a secondary alhocol such as isopropyl alcohol is concentrated, since concentrated solutions of hydrogen peroxide in secondary alcohol are known to decompose rapidly and violently at moderately elevated temperatures. In addition, if the mixture of isopropyl alcohol and the second solvent forms an azeotrope, or when the usual vapour-liquid equilibrium curve approaches the so-called total reflux operating line so closely that a reasonable separation of the mixture becomes very difficult even when a large number of theoretical stages are used, then large quantities of heat will be required to remove said mixture under normal distillation conditions. The present invention describes a process which minimizes or overcomes these difficulties in a safe and economical manner. Under the conditions of the process of the invention the rate of liquid flowing down from the column head will equal the rate of flow of the first solvent, and will be substantially the same throughout the column, differing between the column head and the column base only by the ratio of the latent heats of the two solvents. Hence the concentration of the solute does not vary widely during its transfer from the first solvent to the second solvent and, high concentrations of solute (which would be hazardous with hydrogen peroxide) are avoided. However, it should be noted that in some cases, sometimes even in the case of hydrogen peroxide, it may be advantageous to effect a limited concentration increase across the solvent system, with the criterion that the final concentration will not be in excess of the allowable maximum concentration consistent with thermal decomposition under the operating conditions of the process. However, the transference of the hydrogen peroxide by the process described below may be effected without increasing to an undesirable extent the concentration thereof, during the transfer operation above a level where thermal or otherwise induced decomposition of the solute can occur.

The present invention provides a process for transferring hydrogen peroxide from one solvent to another, which process comprises introducing the hydrogen peroxide dissolved in at least one first solvent (e.g. isopropanol) into the upper portion of a fractionation zone, introducing into the lower portion of said zone at least one less volatile second solvent capable of being volatilized therein without appreciable decomposition of the hydrogen peroxide and said first solvent or solvents, and maintaining thermal conditions in said zone such that, when equilibrium is reached, said first solvent entering at the top of said zone is distilled therefrom with a substantially unchanged constitution (i.e. the first solvent or solvents is or are of similar composition when entering and leaving the zone), whereby said second solvent volatilizes and condenses in said zone so that the hydrogen peroxide becomes dissolved in said second solvent and the resulting solution leaves said zone at its bottom. The second solvent or solvents should preferably be one or more esters solvents of the Formula I below and, as already indicated, must be less volatile than the first solvent or solvents.

It will be appreciated that, providing said zone consists of a distillation column with a sufficient number of theoretical stages, the equilibrium conditions will be reached when the temperature at the top of said zone is such that the composition of the solvent entering and leaving the top of said zone is substantially the same, it being understood that the hydrogen peroxide passes through said zone, entering at the top and leaving at the bottom, while being transferred from the solvent introduced at the top of said zone to said second solvent which is introduced into the bottom of said zone; furthermore, when said first and second solvents form an azeotrope, the composition of the solvent entering and leaving the top of said zone is that of the azeotrope, but when no azeotrope is formed, practically pure first solvent enters and leaves the top of said zone.

Since the process of the present invention is especially applicable to hydrogen peroxide (i.e. solute) dissolved in isopropyl alcohol, the following discussion is directed to a consideration of this particular solute/solvent system.

When isopropyl alcohol, which may be in admixture with an inert solvent, is oxidized in the liquid phase with oxygen or an oxygen containing gas (for example air) at an elevated temperature (e.g. 80 to 160° C.) in the essential absence of heavy metal ions, at a pressure sufficient to maintain said alcohol in the liquid phase, a certain proportion of the isopropyl alcohol is converted into hydrogen peroxide and acetone. This reaction is described in detail in application No. 813,899. As described in application No. 826,364 (of which the entire disclosure is incorporated herein by reference), after separating the said acetone and some water of reaction by distillation or other means known to those skilled in the art, the said isopropyl alcohol is replaced by an ester solvent, into which the hydrogen peroxide is transferred, having the following Formula I $$R—COOR' \quad (I)$$

where each of R and R′ is independently selected from alkyl radicals with up to 5 carbon atoms and alkyl radicals with up to 5 carbon atoms substituted with at least one electrophilic group.

It will be appreciated that R and R′ need not necessarily be different from one another. Preferred values for the said radicals R and R′ are as follows: R is methyl and R′ is n-propyl, isopropyl, sec.-butyl, t-butyl or n-pentyl; or R is ethyl and R′ is ethyl, n-propyl or isopropyl. Some of these ester solvents may form with water an azeotrope boiling at a lower temperature than the ester/isopropyl alcohol azeotrope, said water having been formed during the oxidation of the isopropyl alcohol; the water/ester azeotrope may include some isopropyl alcohol if the ester solvent is such that a ternary azeotrope is formed. Consequently, the solution of hydrogen peroxide in said ester solvent which is produced by distillation is substantially anhydrous, any excess water which is present in the mixture of isopropyl alcohol and hydrogen peroxide being removed initially as an azeotrope. The isopropyl alcohol is then removed by distillation thereof or as an isopropyl alcohol/ester solvent azeotrope. The residue is an anhydrous solution of hydrogen peroxide in the ester solvent and may then be reacted further, for example with a carboxylic acid (e.g. using the process described and claimed in application No. 826,397 of which the entire disclosure is incorporated herein by reference), to form a solution of percarboxylic acid in the ester solvent.

The above azeotropes may be passed to distillation columns and separated into their pure components by means well known in the art and recycled to the process. One preferred ester solvent is n-propyl acetate which forms an azeotrope especially rich in isopropyl alcohol when distilled therewith; another preferred inert solvent is n-pentyl acetate which does not form an azeotrope with isopropyl alcohol.

Figure 1B:
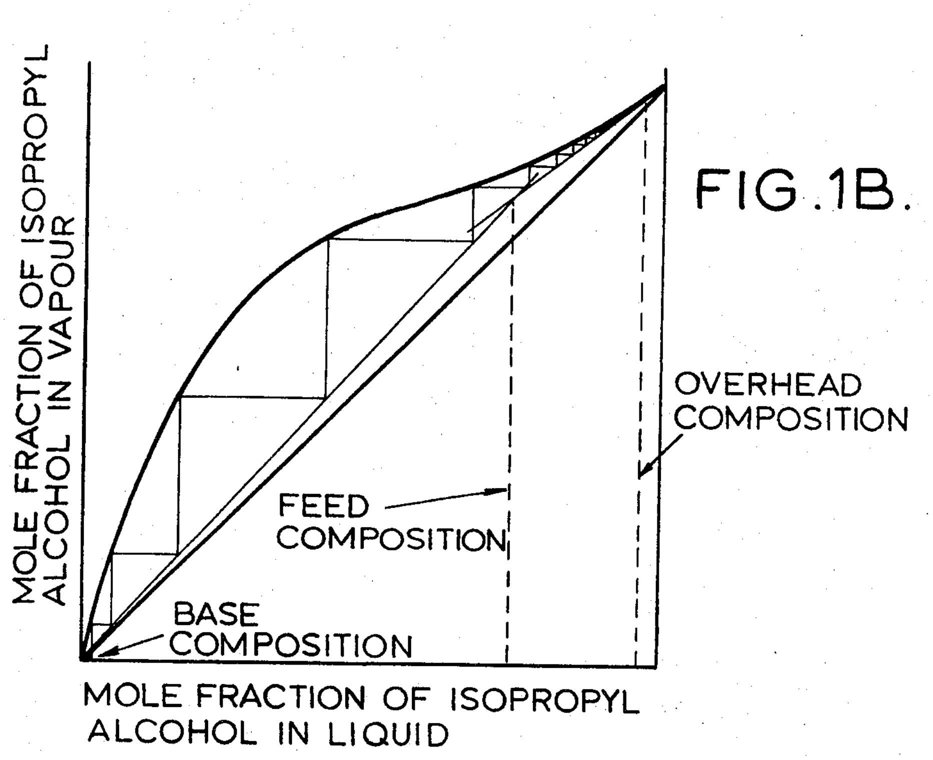

The advantages of the process of the invention will be appreciated more clearly by reference to a vapour-liquid equilibrium curve shown in FIG. 1B of the accompanying diagrammatic drawings which reprdouces a vapour-liquid equilibrium diagram of isopropyl alcohol—ester solvent—hydrogen peroxide, in which hydrogen peroxide is practically involatile. By interpretation of this diagram by the well known McCabe-Thiele method of analysis, it is seen that for the feed composition given, by using a distillation column having 10 theoretical stages above the feed plate and 5 theoretical stages below, an overhead stream rich in isopropyl alcohol and a bottom stream rich in ester solvent and containing hydrogen peroxide can be obtained.

A method of carrying out a process of transferring hydrogen peroxide from isopropyl alcohol to another solvent is described and claimed in application No. 826,364. A block diagram representing a flowsheet for carrying out this method is given in FIG. 1A of the drawings and details describing the application of the vapour-liquid equilibrium data shown in FIG. 1B are indicated below.

Isopropyl alcohol feed to oxidation reactor 1 (a suitable such reactor is described in U.S. Pat. No. 2,871,104 of F. F. Rust, patented Jan. 27, 1959) is derived partly by recycyling unreacted isopropyl alcohol, which may be in admixture with the above ester solvent, via line 14 from a solvent displacement system 13, and partly by the addition of isopropyl alcohol via line 2.

In the reactor 1, the isopropyl alcohol is oxidized with oxygen or an oxygen containing gas such as air which is fed to the reactor via line 3. The resulting oxidized mixture is removed by line 4 to a separation system 5 in which the co-product acetone is separated from the oxidized mixture, and removed via line 6. The acetone is then removed as a by-product through line 8 or is passed to a hydrogenation reactor 7, in which it is reacted with hydrogen, supplied via line 22, to form isopropyl alcohol which may be recycled to the reactor via line 2.

The oxidized mixture remaining after separation of the acetone in the separation system 5 is passed via line 9 to an azeotropic separation stage 10, in which water is separated as an azeotrope and removed via line 11. The essentially anhydrous mixture, which results from this separation, is passed via line 12 to a solvent displacement section 13, constituted by a distillation column, and is fed into theoretical stage 5, as indicated by the McCabe-Thiele graphical interpretation of FIG. 1B, together with the ester solvent (which is to replace the solvent of the mixture flowing through line 12) which is introduced through line 16.

The overhead vapour, containing the unreacted isopropyl alcohol and some ester solvent, has a constitution as indicated in FIG. 1B and is passed to a condenser 18 via line 17. The condensed mixture is then separated into two streams by a reflux divider 19, the ratio of the streams being determined by calculation methods well known to those skilled in the art. Thus, line 20 carries part of the mixed stream back to the distillation column 13, and line 14 recycles the mixture to the oxidation reactor 1. The required solution of hydrogen peroxide in inert solvent which may contain very small amounts of isopropyl alcohol, leaves via line 15; this solution has an ester solvent-isopropyl alcohol composition which is shown as base composition in FIG. 1B. As indicated above, the necessary amount of ester solvent for this displacement is supplied via line 16 and mixed with the initial solution of hydrogen peroxide in isopropyl alcohol before entering the distillation column 13.

In order to achieve the desired separation as depicted in FIG. 1B, reflux conditions must be maintained which require a large amount of heat to be supplied to the system and this is done through a reboiler 21; moreover, a relatively large number of theoretical stages, in this case ten, numbered from 6 to 15, are required in the rectification section of the separating column, in addition to the five theoretical stages, numbered from 1 to 5, in the stripping section.

Figure 2B:
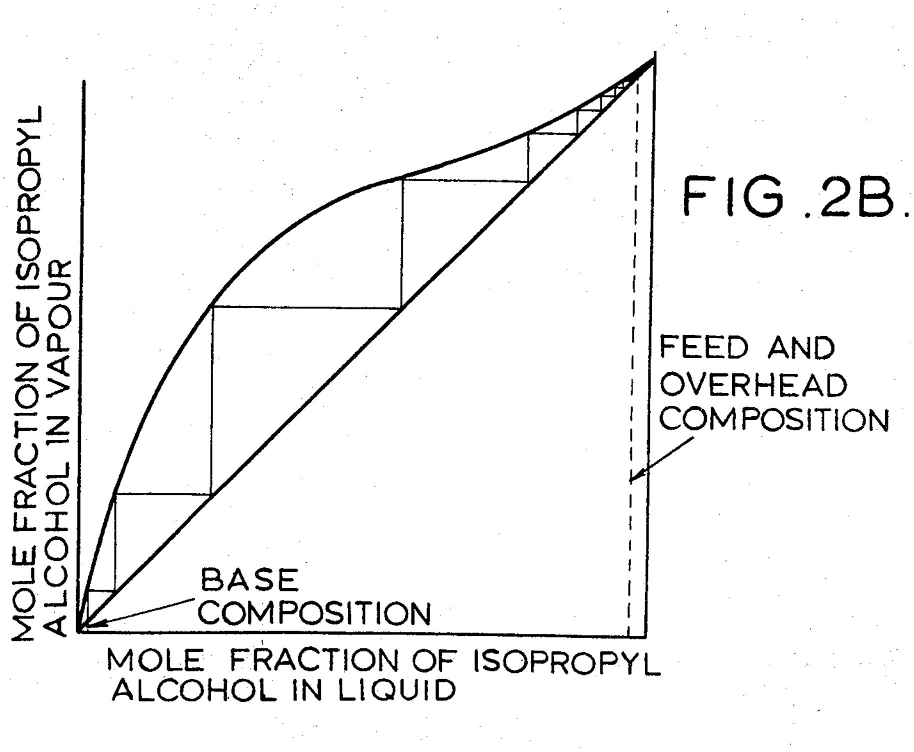

One method of carrying out the process of the invention will now be described by reference to FIGS. 2A and 2B of the drawings which correspond to the block diagram flowsheet and vapour-liquid equilibrium diagram respectively depicted in FIGS. 1A and 1B, but with the appropriate modification of the separating stage which is constituted by only ten theoretical stages in FIG. 2A instead of fifteen in FIG. 1A.

Figure 2A:
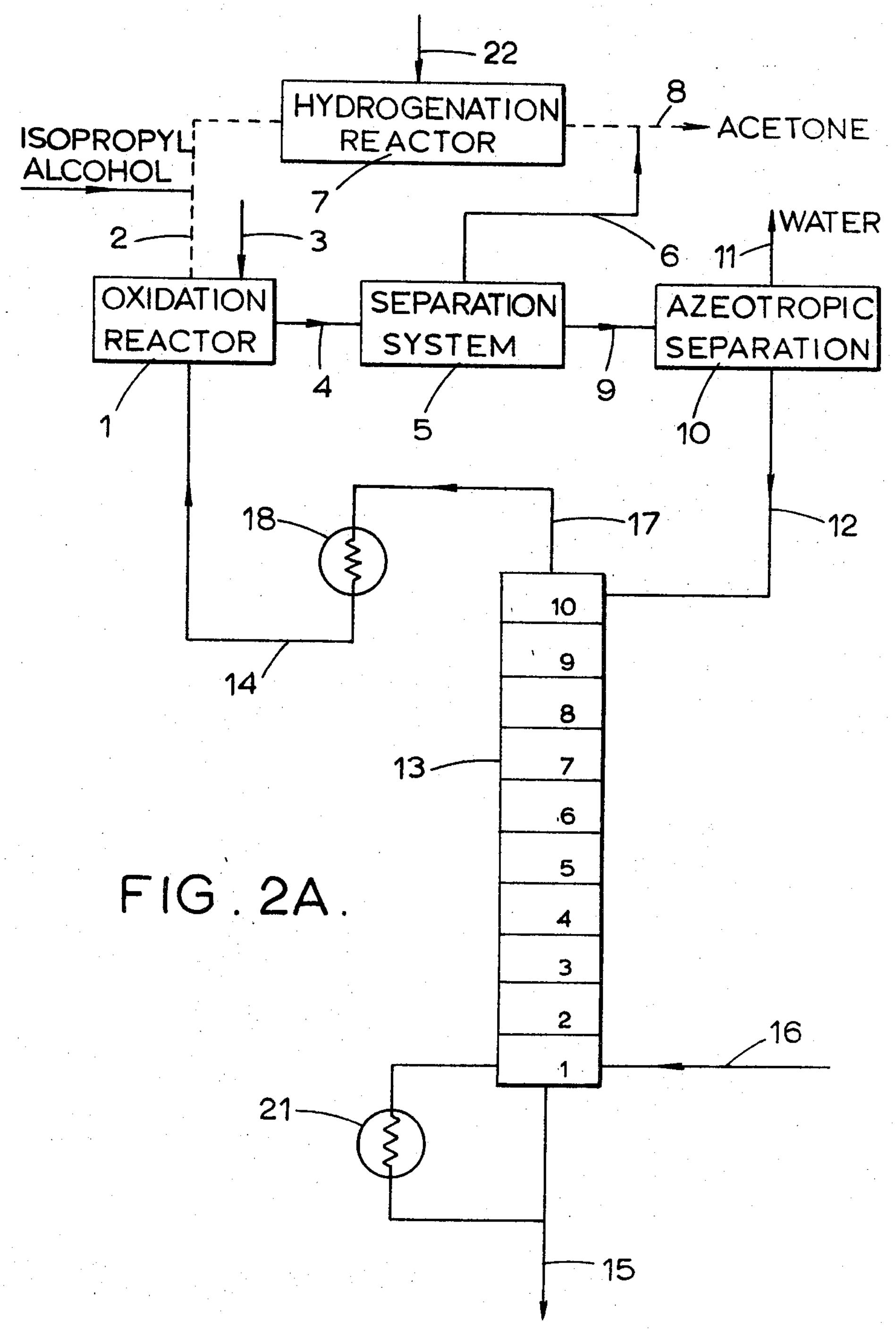

The method of carrying out the process illustrated by FIG. 2A is the same as for FIG. 1A up to the stage where the stream leaves the azeotrope separation stage 10 by line 12.

The isopropyl alcohol solution of hydrogen peroxide, which may be in admixture with another solvent (e.g. the ester solvent as will become apparent from the description below), is carried by line 12 into the theoretical stage shown as 10 of a distillation column 13 having ten theoretical stages numbered from 1 to 10, i.e. the upper portion of a fractionating zone. The overhead vapour leaving by line 17 has a similar composition of unreacted isopropyl alcohol and ester solvent as that fed into the distillation column, but the relatively involatile hydrogen peroxide present in stream 12 will pass down the column and only very small amounts will be present in the overhead stream. This overhead stream may then be liquefied by means of a condenser 18 and recycled via line 14 to the oxidation reactor 1. As the hydrogen peroxide passes down the theoretical stages from stage No. 10 to stage No. 1, the mixture will become richer in ester solvent. The ester solvent-hydrogen peroxide stream leaving by line 15 is almost entirely hydrogen peroxide dissolved in the ester solvent with only a small content of isopropyl alcohol. The necessary ester solvent for this displacement is supplied via line 16 which is at the very bottom of the column 13, in this case theoretical stage 1. However, it is to be noted that it would be possible to introduce part of the ester solvent at one or more other theoretical stages further up the column, e.g. at stage No. 2 and/or stage No. 3, and so on, but this is less economical as regards heat consumption.

By feeding the isopropyl alcohol solution of hydrogen peroxide into the upper portion of the distillation column and the ester solvent into the bottom thereof a considerable advantage over the process described by reference to FIGS. 1A and 1B of the drawings may be obtained, but this advantage would be diminished if the feed position for the ester solvent is shifted towards the feed position for the isopropyl alcohol-hydrogen peroxide mixture. Nevertheless, the process of the invention is not limited to the case where ester solvent is introduced at the lowermost theoretical stage and the hydrogen peroxide solution in isopropyl alcohol is introduced into the uppermost one: some advantage will generally be obtained, providing the ester solvent is introduced below the hydrogen peroxide in isopropyl alcohol solution.

It will be seen that the distillation column 13 constitutes the fractionation zone of the process of the invention.

It is possible to effect the replacement of the isopropyl alcohol solvent with the above mentioned ester solvent extremely economically since the heat necessary to maintain the above mentioned required conditions in the distillation column by means of a reboiler approaches the theoretical minimum.

With certain ester solvents having a relatively high boiling point it is preferable to operate the distillation column of the process under a vacuum in order to reduce the temperature in the reboiler of the distillation column to a level where thermal decomposition of the hydrogen peroxide is minimized.

If a large number of theoretical stages is used in the process of the invention, the total pressure drop is relatively large and a vacuum must be applied in order to obtain the desired operating temperature in the reboiler. Thus, as the number of theoretical stages is reduced, the pressure drop is also reduced and for the same reboiler temperature the vacuum required can be lower, with a subsequent reduction in column diameter and capital costs.

It will be appreciated that in the process of the invention the first solvent preferably consists of, or contains, isopropanol; the said first solvent suitably is constituted by a plurality of solvents, e.g. isopropanol and acetone. The preferred ester solvents of Formula I are n-propyl acetate and n-pentyl acetate.

The following examples illustrate the invention without limiting it, the procedure used being as indicated above by reference to the drawings; all parts are by weight.

EXAMPLE 1

500 ml. of anhydrous n-propyl acetate were charged to a well seasoned 1 litre Pyrex flask, fitted with a well seasoned 150 cm. long packed column containing aluminium lessing rings, and the temperature was raised to reflux at atmospheric pressure by means of a heating mantle. The overhead vapour, at a temperature of 102° C., was condensed and returned to the column under total reflux; after 30 minutes, the distillation rate was set to take off 4.7 ml. per minute. Simultaneously n-propyl acetate was added at the bottom of the column at a rate of 4.7 ml. per minute and a mixture of 78.3 parts of isopropyl alcohol, 14.4 parts of n-propyl acetate and 7.3 parts of hydrogen peroxide were pumped into the top of the column. The overhead temperature rapidly fell to 82°C., whereupon 4.7 ml. per minute of the inert solvent containing hydrogen peroxide was continuously removed from the bottom of the flask. After 30 minutes operation, a sample of the overhead distillate was analysed and found to contain isopropyl alcohol and n-propy acetate in the proportion 84.5 parts to 15.5 parts respectively. The product leaving the flask was found to contain less than 0.05% by weight of isopropanol. This mixture was also analysed for hydrogen peroxide, which determination showed that a small proportion of the hydrogen peroxide had decomposed during its passage through the column. A stoichiometric quantity of water, according to the equation $$H_2O_2 \rightarrow H_2O + \frac{1}{2}O_2$$

was found in the overhead stream.

Comparative procedure

The following description of Case 1 and Case 2 shows respectively the heat required to effect the separation by the method of operation described in FIGS. 1A and 1B (i.e., using a procedure outside the scope of the present invention), and the heat required for carrying out the procedure making use of the process of the present invention; the procedure adopted on both occasions was as described above by reference to FIGS. 1A and 1B and FIGS. 2A and 2B respectivey.

Case 1.—A vapour-liquid equilibrium diagram for the system isopropanol/n-propyl acetate (in which for practical purposes hydrogen peroxide was found by us to be involatile) was plotted from data produced from a Gillespie still, and the appropriate McCabe-Thiele diagram established. A minimum reflux ratio of 1.56:1 (i.e., at an infinite number of theoretical stages) was calculated and by use of these data a stream containing 78.1 parts by weight of isopropyl alcohol, 8.1 parts of hydrogen peroxide and 13.8 parts of n-propyl acetate was diluted with 34.0 parts of n-propyl acetate and fed into the 12th theoretical stage of a distillation column containing a total of 25 theoretical stages. By adjusting the reflux ratio to 2.0:1, an overhead stream containing 14.9 parts of n-propyl acetate and 85.1 parts isopropyl alcohol was obtained, while the bottom stream containing the hydrogen peroxide had less than 0.05 part of isopropanol present. The heat required to effect this separation amounted to $7.4 \times 10^5$ kilocalories per 100 kilograms of hydrogen peroxide.

Case 2.—In accordance with a McCabe-Thiele diagram a mixture containing 78.1 parts by weight of isopropyl alcohol, 8.1 parts of hydrogen peroxide and 13.8 parts of n-propyl acetate was added at the top of the column, while a stream of recycled n-propyl acetate was fed into the bottom. After several hours of operation, when equilibrium had been attained, a position of steady state operation was reached.

An analysis of the top and bottom stream showed that the overhead stream contained 14.9 parts of n-propyl acetate, 85.1 parts of isopropyl alcohol and less than 0.01 part of hydrogen peroxide, while the bottom stream of hydrogen peroxide in n-propyl acetate contained less than 0.05 part of isopropyl alcohol. The heat required to effect this separation was $2.45 \times 10^5$ kilocalories per 100 kilograms of hydrogen peroxide processed.

EXAMPLE 2

300 g. of isopropyl alcohol containing 1.5 g. of hydrogen peroxide and a trace amount of acetone were oxidized with air over a period of 5 hours at a temperature of 125° C. and a pressure of 60 p.s.i.g. Transition metal ions were excluded from the reaction system. The product obtained consisted of 17.9 g. of hydrogen peroxide and 35 g. of acetone in isopropyl alcohol containing about 0.5% of water. The weight of solution obtained was 298 g. and the hydrogen peroxide prepared represented a yield of 80% based on the weight of acetone produced as co-product. The acetone was removed from the oxidation product by fractional distillation. This product mixture was fed during one hour to the head of a fractionating column which was attached to a flask containing 250 g. of n-pentyl acetate under total reflux. After attaining steady state condition, a distillate containing 243 g. of isopropyl alcohol, 0.2 g. n-pentyl acetate and about 3 g. of water was collected.

The product remaining in the flask consisted of 245 g. of a solution containing a trace of isopropyl alcohol, 15.2 g. of hydrogen peroxide and less than 0.1% of water.

EXAMPLE 3

503 g. of a mixture containing 3.0 g. of hydrogen peroxide and a trace amount of acetone in 425 g. of isopropyl alcohol and 75 g. n-propyl acetate were oxidized with commercially pure oxygen over a period of 6 hours at a temperature of 120° C. and a pressure of 60 p.s.i.g. The resulting solution contained 28.8 g. of hydrogen peroxide, 61.4 g. of acetone, 4.1 g. of water and 74.2 g. of n-propyl acetate in isopropyl alcohol. The yield of hydrogen peroxide was thus 80% based on the acetone produced as co-product. The acetone was fractionally distilled from the product, and the residue was added continuously over 1½ hours to the head of a distillation column, in which 250 g. of n-propyl acetate was totally refluxed.

When the concentration of hydrogen peroxide in the flask had reached 5.5%, product was removed at a rate approximately equal to the rate of feed to the column head. Constant level was maintained by feeding n-propyl acetate to the flask. The distillates collected over the entire operation consisted of 6.0 g. of water and 53.5 g. of n-propyl acetate in 358 g. of isopropyl alcohol, but no hydrogen peroxide distilled. The product from the flask consisted of a solution of n-propyl acetate containing 24.5 g. of hydrogen peroxide, less than 0.1% isopropyl alcohol and traces of acetone and water.

EXAMPLE 4

603 g. of a mixture containing 3.0 of hydrogen peroxide and a trace of acetone in a mixture of 312 g. isopropyl alcohol and 282 g. isopropyl acetate were oxidized with air over a period of 8 hours at a temperature of 125° C. and a pressure of 60 p.s.i.g. The product obtained, which weighed 618 g., contained 20.0 g. of hydrogen peroxide, 35.8 g. of acetone, 2.0 g. of water and 280 g. of isopropyl acetate. The hydrogen peroxide yield was 81%, based on the weight of acetone produced as co-product. The acetone was removed by fractional distillation and the kettle residue was then added continuously over 2 hours, to the head of a distillation column which was under total reflux with n-propyl acetate.

The distillate contained 273.5 g. of isopropyl alcohol, 3.5 g. of water and 242.5 g. of isopropyl acetate. The residue in the flask was essentially anhydrous and contained 17.1 g. of hydrogen peroxide and traces of acetone and isopropyl alcohol in 322.5 g. of isopropyl acetate.

EXAMPLE 5

Isopropyl alcohol was oxidized and the excess isopropyl alcohol was displaced with n-propyl chloroacetate in similar manner to that of previous examples. The resulting solution had a total weight of 521.3 g. and contained 17.2 g. of hydrogen peroxide and traces of acetone, isopropyl alcohol and water.

When it is desired to produce propylene oxide or a percarboxylic acid solution, the solution obtained by carrying out the procedure of Example 1, Case 2 or any one of Examples 2–5 above is further processed in accordance with any one of Examples 1–8 of application No. 826,364 in the case of propylene oxide, or any one of Examples 1–8 of application No. 826,397 in the case of a percarboxylic acid solution.

Although the present invention is described herein with particular reference to specific details, it is not intended that such details shall be regarded as limitations upon the scope of the invention except insofar as included in the accompanying claims.

We claim:

1. A process for transferring hydrogen peroxide from one solvent to another, which process comprises introducing the hydrogen peroxide dissolved in at least one first solvent into the upper portion of a fractionation zone, introducing into the lower portion of said zone at least one second less volatile solvent capable of being volatilized therein without appreciable decomposition of the hydrogen peroxide and said first solvent, and maintaining thermal conditions in said zone such that, when equilibrium is reached, said first solvent entering at the top of said zone is distilled therefrom with a substantially unchanged constitution, whereby said second solvent volatilizes and condenses in said zone so that said hydrogen peroxide becomes dissolved in said second solvent and the resulting solution leaves said zone at its bottom.

2. A process according to claim 1, in which said first solvent comprises isopropanol.

3. A process according to claim 1, in which the hydrogen peroxide entering said zone is dissolved in a plurality of solvents.

4. A process according to claim 2, in which said first solvent is a mixture of isopropanol and acetone.

5. A process according to claim 1, in which said second solvent is an ester solvent of the Formula I $$R\text{—}COOR' \qquad (I)$$

where each of R and R′ is independently selected from the class consisting of alkyl radicals with up to 5 carbon atoms and alkyl radicals and up to 5 carbon atoms substituted with at least one electrophilic group.

6. A process according to claim 5, in which said ester solvent is n-propyl acetate.

7. A process according to claim 5, in which said ester solvent is n-pentyl acetate.

8. A process according to claim 1, in which the fractionation zone has a plurality of stages and the hydrogen peroxide solution is introduced at the first stage of the fractionation zone and said second solvent is introduced at the last stage.

9. A process for transferring hydrogen peroxide from one solvent to another, comprising introducing hydrogen peroxide dissolved in isopropyl alcohol solvent in the upper portion of a fractionation zone, introducing into the lower portion of said zone an ester solvent which is more volatile than isopropyl alcohol and which is capable of being volatilized in said zone without appreciable decomposition of the hydrogen peroxide and isopropyl alcohol, maintaining thermal conditions in said zone to distill isopropyl alcohol solvent of substantially unchanged composition therefrom and to cause the ester solvent to volatilize and condense in said zone whereby hydrogen peroxide becomes dissolved in the ester solvent, and removing the resulting solution of the ester solvent and hydrogen peroxide from the bottom of said zone.

10. A process as defined in claim 9 wherein the ester solvent is introduced at a rate that the flow rate of liquid down the column substantially equals the flow rate of isopropyl alcohol solvent whereby the concentration of hydrogen peroxide during transfer in said zone remains substantially the same.

References Cited

UNITED STATES PATENTS

| | | | |
|---|---|---|---|
| 2,749,291 | 6/1956 | Pierotte et al. | 23—207 |
| 2,949,343 | 8/1960 | Hood et al. | 23—207 |
| 3,063,857 | 1/1962 | Schatz et al. | 203—63 |
| 3,321,279 | 5/1967 | Williams | 23—207 |
| 3,364,988 | 1/1968 | Hartmann | 23—270.5 |
| 3,398,185 | 8/1968 | MacLean et al. | 203—61 |

WILBUR L. BASCOMB, JR., Primary Examiner

U.S. Cl. X.R.

23—207, 312 W; 203—12; 260—348.5 L, 643 D

UNITED STATES PATENT OFFICE

CERTIFICATE OF CORRECTION

Patent No. 3,682,781 Dated August 8, 1972

Kenneth Jones et al

It is certified that errors appear in the above identified patent and that said Letters Patent are hereby corrected as shown below:

Column 1, line 8, after "England" insert -- , assignors to Burmah Oil Trading Limited, London, England. --

Column 3, line 41, change "reprdouces" to -- reproduces --

Column 6, line 51, delete "$2.45 \times 10^5$" and insert therefor -- $2.46 \times 10^5$ --

Column 7, line 28, after "3.0" insert -- g. --

Signed and sealed this 23rd day of January 1973.

(SEAL)
Attest:

EDWARD M.FLETCHER,JR.
Attesting Officer

ROBERT GOTTSCHALK
Commissioner of Patents